United States Patent Office 3,749,717
Patented July 31, 1973

3,749,717
THIAZOLINYL AND THIAZINYL DERIVATIVES OF BENZIMIDAZOLES
Rudiger D. Haugwitz, Highland Park, and Barbara V. Maurer and Venkatachala L. Narayanan, Hightstown, N.J., assignors to E. R. Squibb & Sons, Inc., New York, N.Y.
No Drawing. Filed May 4, 1971, Ser. No. 140,280
Int. Cl. C07d 93/00
U.S. Cl. 260—243 R
10 Claims

ABSTRACT OF THE DISCLOSURE

Thiazolinyl and thiazinyl derivatives of benzimidazoles are provided having the structure

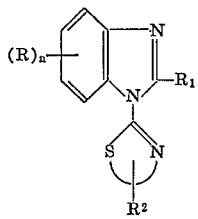

and which are useful as anthelmintic agents and anti-inflammatory agents.

---

The present invention relates to thiazolinyl and thiazinyl derivatives of benzimidazoles having the structure (I)

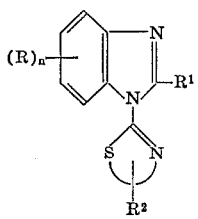

wherein R is hydrogen, lower alkyl, lower alkoxy, aralkyl, aryl, substituted aryl, acyl, aroyl, lower alkylthio, aryloxy, arylthio, trifluoromethyl, nitro, halogen, cyano, thiocyanato, amido, substituted amido

wherein $R^3$ is hydrogen, lower alkyl, aryl or alkylaryl, amino, substituted amino, dialkylaminoalkyl, alkyloxy- or aryloxycarbonyl

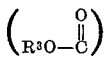

carboxyl, carbamate ester (—NHCOOR$^4$ wherein $R^4$ is alkyl, arylalkyl, aryl or substituted aryl), carbamoyl or thiocarbamoyl

Q is O or S and $R^5$ is alkyl, aryl or cycloalkyl, $R^1$ is hydrogen, lower alkyl, arylalkyl, cycloalkyl, aryl, alkylaryl, alkanoic acid (—($R^6$)$_{n^1}$ COOH wherein $R^6$ is alkylene containing from 1 to about 6 carbon atoms and $n^1$ is 0 or 1), halogen or heterocyclic containing one, two or three hetero atoms such as N, O and/or S, $R^2$ can be hydrogen, lower alkyl, arylalkyl, aryl, or lower alkylaryl; $n$ is 1 or 2.

The radical

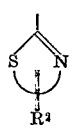

represents a 5- or 6-membered ring containing 3 or 4 carbon atoms, respectively, wherein the additional 2 or 3 carbon atoms (not shown) may include a substituent other than hydrogen as indicated above.

The lower alkyl groups represented by the above R groups include straight or branched chain aliphatic hydrocarbon radicals having up to seven carbon atoms, such as methyl, ethyl, propyl, isopropyl, butyl, isobutyl, t-butyl, amyl, hexyl, heptyl, and the like. The lower alkyl groups can include as substituents any of the aryl groups mentioned below as well as halogen.

The alkylene group represents a divalent group corresponding to the above alkyl groups.

The cycloalkyl group contains from three to about eight carbons and includes for example cyclopropyl, cyclobutyl, cyclopentyl, cyclohexyl, cycloheptyl and cyclooctyl.

The alkoxy group or that portion of the alkoxycarbonyl group includes straight and branched chain radicals of up to and including seven carbon atoms, corresponding to the above alkyl groups, e.g., methoxy, ethoxy, propoxy, isopropoxy, and the like. The aryloxy group or that portion of the aryloxycarbonyl group includes any of the aryl groups set out below.

The term halogen includes each of the four halogens, but fluorine and chlorine are preferred.

The substituted amido groups

wherein $R^3$ can be lower alkyl, arylalkyl, alkylaryl or aryl, wherein lower alkyl and aryl are as defined herein, can include methylamido ethylamido, isopropylamido, heptylamido, phenylamido, benzylamido, or naphthylamido.

The substituted amino groups include mono- or di-lower alkyl-, arylalkyl-, lower alkylaryl- or arylamino wherein lower alkyl and aryl are as defined herein, such as methylamino, ethyamino, isopropylamino, heptylamino, dimethylamino, diethylamino, ethylmethylamino, butylmethylamino, ethyl i-propylamino, anilino, benzylamino, diphenylamino, naphthylamino, or N - methyl - N - phenylamino and the like.

The term "aryl" includes monocyclic or bicyclic monovalent aromatic ring systems such as phenyl or naphthyl. These aryl radicals can include as substituents halogen, nitro, trifluoromethyl, alkoxy, alkanoic acid, amido or substituted amido as defined above or any of the alkyl groups mentioned hereinbefore.

The acyl and aroyl groups included herein are derived from hydrocarbon carboxylic acids of less than twelve carbon atoms, which may be exemplified by the lower alkanoic acids (e.g., formic, acetic, propionic, butyric, valeric, trimethyl acetic and caproic acids), the lower alkenoic acids (e.g., acrylic, methacrylic, crotonic, 3-butenoic and senecioic acids), the monocyclic aryl-carboxylic acids (e.g., benzoic and toluic acids), the monocyclic aryl-lower alkanoic acids [e.g., phenacetic, β-phenylpropionic, α -phenylbutyric, and 5 - (p - methylphenyl) pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cycloalkyl and cycloalkenyl-lower alkanoic acids [e.g., cyclohexaneacetic, α-cyclopentanebutyric, 2-cyclopenteneacetic and 3-(3-cyclohexene)pentenoic acid], and the like.

The $R^1$ radicals can include heterocyclic groups such as thienyl, furyl, chlorofuryl, dichlorofuryl, pyrryl, pyridyl, coumarinyl, thiacoumarinyl, thiazolyl, isothiazolyl or imidazolyl. Furthermore, the $R^1$ group can include piperazinyl, alkylpiperazinyl and pyrazinyl.

3

The heterocyclic radical may, if desired, be substituted at a carbon atom with a lower hydrocarbon group such as a lower alkyl radical.

Exemplary of compounds falling within the present invention include, but are not limited to, the following set out in Table A below:

TABLE A

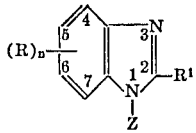

| | R | n | R¹ | Z |
|---|---|---|---|---|
| 1 | H | | CH₃ | 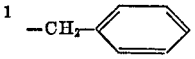 |
| 2 | Cl (5) | 1 | —CH₂—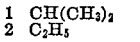 | Same as above. |
| 3 | NO₂ (6) | 1 | CH(CH₃)₂ | Do. |
| 4 | CH₃ (5, 6) | 2 | C₂H₅ | Do. |
| 5 | CH₃O (4) | 1 | —Cl | Do. |
| 6 | NCS— (5) | 1 | H | Do. |
| 7 | CH₃OCNH (6) <br> ‖ <br> O | 1 | 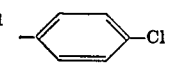 | Do. |
| 8 | H | | 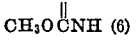—OCH₃ | Do. |
| 9 | CH₃OC—NH— (5) <br> ‖ <br> O | 1 | H | Do. |
| 10 | Br (5) | 1 | C₃H₇ | Do. |
| 11 | N(CH₃)₂ (6) | 1 |  | 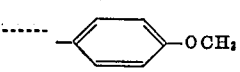 |
| 12 | I (5) | 1 | 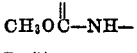 | Same as above. |
| 13 | Cl (4,7) | 2 | CH₃ | 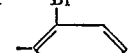 |
| 14 | C₂H₅C (5) <br> ‖ <br> O | 1 | —CH₂— | Same as above. |
| 15 | C₆H₅S— (5) | 1 | 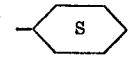 | Do. |
| 16 |  (5) | 1 | —CH₂— | Do. |
| 17 | CH₃O (5,6) | 2 | H | 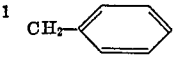 |
| 18 | CN (4) | 1 | CH(CH₃)₂ | Same as above. |
| 19 | C₆H₅CH₂ (5) | 1 | H | Do. |
| 20 | CF₃ (6) | 1 | —F | Do. |
| 21 | C₆H₅O (5) | 1 | 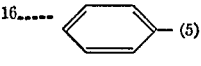 | Do. |
| 22 | Cl—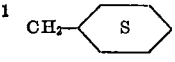 (5) | 1 | —CH₂COOH |  |

TABLE A—Continued

| | R | n | R¹ | Z |
|---|---|---|---|---|
| 23 | CH₃—⟨⟩—(6) | 1 | CCl₃ | (thiazoline) |
| 24 | C₂H₅\N—(CH₂)₂—(5)\C₃H₇ | 1 | (furyl) | (phenyl-thiazoline) |
| 25 | C₆H₅OC(O)—(6) | 1 | (isothiazolyl) | (thiazine) |
| 26 | C₆H₅CH₂OC(O)NH—(5) | 1 | (thiazolinyl) | (thiazoline) |
| 27 | CH₃NHC(O)NH—(6) | 1 | (thiazolyl) | (C₆H₅-thiazine) |
| 28 | (thienyl)NHC(O)— | 1 | (thiazolyl) | (thiazine) |
| 29 | (CH₃)₂CH—(5) | 1 | H | Same as above. |
| 30 | CH₃O (6) | 1 | C₆H₅ | Do. |
| 31 | CH₃O—⟨⟩—CH₂—(5) | 1 | CH₂COOH | (thiazoline) |
| 32 | CF₃ | 1 | Cl | (thiazine) |
| 33 | CH₃—⟨⟩—S— | 1 | (furyl) | (thiazoline) |
| 34 | CN (6) | 1 | C₆H₅—CH₂— | (phenyl-thiazoline) |
| 35 | —SCN (6) | 1 | (naphthyl) | (thiazine) |
| 36 | (CH₃)₂N—(CH₂)₃—NH (5) | 1 | CF₃—⟨⟩— | (thiazoline) |
| 37 | CH₃CONH (6) | 1 | NO₂—⟨⟩— | (NO₂-phenyl-thiazoline) |

Compounds of Formula I can be prepared by first converting the benzimidazole (II) into its salt (III) by employing metal hydrides such as sodium hydride, metal amides, such as sodium amide, alkali metal alkoxides, such as sodium methoxide, potassium ethoxide or sodium butoxide,

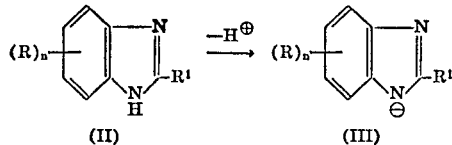

The above reaction can be brought about in a variety of aprotic solvents such as aromatic hydrocarbons, e.g., benzene, toluene or xylene, or ethers such as ethyl ether or glyme, at temperatures ranging from about 0° to about 150° for periods of about one hour to twenty-four hours. A slight excess of the base is desirable; thus the molar ratio of benzimidazole II to base can range from about 1:1 to about 1:2.

The salt (III) is reacted with an aliphatic haloalkylisothiocyanate (IV) to yield thiourea (V) which under goes intramolecular alkylation to form the benzimidazoles (I).

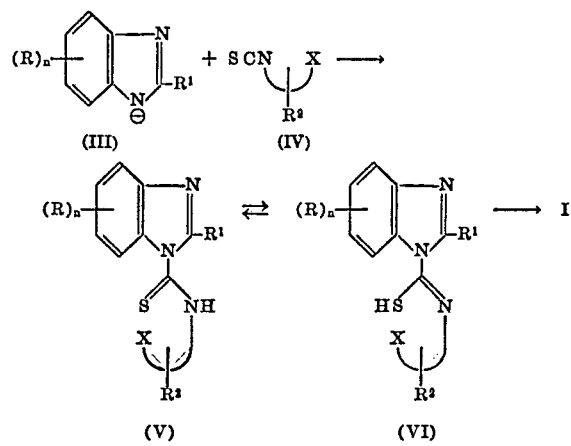

wherein X is Cl or Br and the portion

(which links N and X) in structure IV represents a chain of 2 or 3 carbon atoms one carbon atom of which may include an $R^2$ substituent other than hydrogen.

The molar ratio of benzimidazole (III) to haloalkylisothiocyanate (IV) can range from 1:1 to 1:5. The reaction time can vary from about 1 to about 10 hours at temperatures from about 35° to about 150°.

The preparation of a variety of benzimidazoles is well documented in Weissberger's The Chemistry of Heterocyclic Compounds, Imidazole and Its Derivatives, Interscience Publishers Co., New York, 1953.

It is to be understood that unsubstituted benzimidazoles III, that is where R and $R^1$ are hydrogen, can be employed to form compounds of Formula I and thereafter any of the other R radicals can be inserted in the benzimidazole ring in place of one or two hydrogens, employing conventional procedures as will be apparent to one skilled in the art.

Haloalkylisothiocyanates (IV) are readily synthesized from their corresponding haloalkyl amines (VII) and thiophosgene:

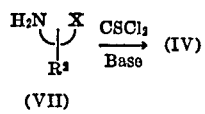

Additional routes toward compounds of structure (IV) are described in Houben-Weyl's Methoden Der Organischen Chemie, vol. 9, G. Thieme Verlag Stuttgart, 1955.

Benzimidazoles containing a free imino hydrogen are virtually tautomeric systems, differing in the position of the imino hydrogen as seen below (A⇌B). These benzimidazoles react like tautomeric mixtures of the two possible forms. The reaction products (C and D) are not necessarily obtained in equal parts but in proportions that differ from compound to compound, substituents and reaction conditions having a pronounced effect on the course of the reaction.

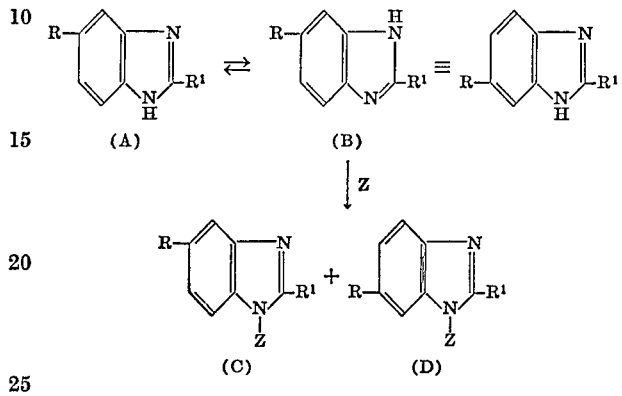

Examples of benzimidazole starting materials II which can be employed herein include the following:

TABLE B

| | R | n | $R^1$ |
|---|---|---|---|
| 1 | 5—$NO_2$ | 1 | H |
| 2 | 5—$C_6H_5$C(=O)— | 1 | Cl |
| 3 | 5—$C_6H_5CH_2$ | 1 | $C_6H_5$ |
| 4 | 5,6-di-$CH_3$ | 2 | $C_6H_5CH_2$— |
| 5 | 5-$C_4H_9$—O—C(=O) | 1 | $CH_2COOH$ |
| 6 | 5-($CH_3$)($CH_3$)N—C(=O) | 1 | $C_6H_5C_2H_4$— |
| 7 | 5-$NO_2$ | 1 | —C6H4—$OCH_3$ |
| 8 | H | | $C_6H_{13}$ |
| 9 | 5-$C_2H_5O$ | 1 | $CH_3$ |
| 10 | 7-CN | 1 | F |
| 11 | 5-$CH_3S$ | 1 | Br |
| 12 | 5,6-di-Cl | 2 | H |
| 13 | 5-F | 1 | Cl |
| 14 | 5-$CF_3$—C6H4— | 1 | —$C_3H_6COOH$ |
| 15 | 5-$CF_3$ | 1 | —$CH_2COOH$ |
| 16 | 6-$C_6H_5$S— | 1 | thienyl |
| 17 | 5-$C_6H_5$C(=O)— | 1 | pyridyl |
| 18 | 6-$C_6H_5$CNH(=O) | 1 | $C_6H_5$ |
| 19 | 6-$C_6H_5CH_2OC(=O)NH$ | 1 | thiazolyl |

Examples of aliphatic haloalkylisothiocyanates which can be employed herein include the following:

$SCN-CH_2CH_2Br$ $SCN-CH_2CH_2CH_2Cl$

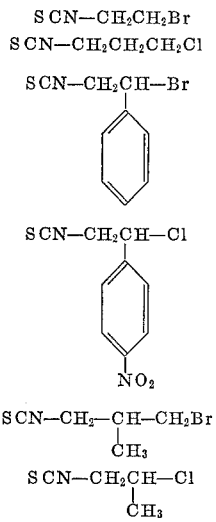

$SCN-CH_2-CH-CH_2Br$
$\quad\quad\quad\quad\,\,|$
$\quad\quad\quad\quad CH_3$ $SCN-CH_2CH-Cl$
$\quad\quad\quad|$
$\quad\quad\,CH_3$ The compounds of Formula I form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic acid. Illustrative are the hydrohalides, especially the hydrochloride and hydrobromide which are preferred, sulfate, nitrate, phosphate, oxalate, tartrate, maleate, fumarate, citrate, succinate, methanesulfonate, benzenesulfonate, toluenesulfonate, and the like.

The benzimidazoles described herein have anthelmintic activity and are useful in the treatment and/or prevention of helminthiasis, a parasitic disease which causes widespread and often serious infection in domesticated animals such as swine, horses, cattle, sheep and goats. In treating domesticated animals, the compounds may be mixed with a nontoxic, edible carrier to form a feed supplement which is then incorporated in the animal feed in the desired concentration, or they may be administered in unit dosage forms which, in the case of large domesticated animals, take the form of boluses, or in the form of a liquid drench. Alternatively, water-soluble salts or a dispersible, wettable powder containing the anthelmintic agent may be added to the drinking water of the animals.

The preferred dosage level for treating a helminth infection will depend to a large extent on the particular benzimidazole compound being employed, on the severity of the infection and on the particular species of animal to be treated. In general, the benzimidazoles exhibit anthelmintic activity when administered to animals in a daily dose of about 50 to about 300 mg. per kilogram of animal body weight. It is preferred to employ in the range of 100–200 mg. per kilogram of body weight per day. The compounds may be given in a single dose or divided into a plurality of smaller doses. If desired, the course of treatment may be extended over a period of days in which case the optimum daily dose level may be lowered. When the compounds are to be employed primarily as prophylactic agents for the provention of helminthic infections, the preferred daily dose level is, of course, lower than the therapeutic level is, preferably in the range of about 10–70 mg. per kilogram of body weight. The benzimidazoles may be incorporated in the animal feeds, and this method of administration is preferred when the compounds are to be used prophylactically, in which case they are incorporated in the feeds at concentrations such that the animal will consume daily from about 10 to about 70 mg. of benzimidazole per kilogram of body weight.

The means employed for administering these benzimidazoles to animals are not critical, and any of the methods now used or available for treating animals infected with or susceptible to parasitic infections are satisfactory. When these substances are employed therapeutically to treat an established infection, they are conveniently administered in a unit dosage form such as in a capsule, bolus, tablet, or as a liquid drench. It will be noted that all of these methods contemplate oral administration, since this is the most effective method of treating the worm-infested stomach or intestinal tract.

When the benzimidazoles are to be administered in unit dosage form, capsules, boluses or drenches containing the desired amount of anthelmintic distributed in a pharmaceutically acceptable vehicle are usually employed. These are prepared by intimately and uniformly mixing the active ingredient with suitable finely divided diluents, suspending agents, fillers, disintegrating agents and/or binders such as starch, lactose, talc, magnesium stearate, vegetable gums and the like. These unit dosage formulations may be widely varied with respect to their total weight and content of anthelmintic agent, depending on factors such as the type of host animal to be treated, the dose level desired, and the severity and type of parasitic infestation. For large animals such as sheep, swine or cattle, boluses weighing up to 15 grams may be used, although it is preferred to employ boluses weighing from 2–10 grams and containing from 1–5 grams of the anthelmintic agent. These boluses, as well as smaller size tablets, contain binders and lubricants, and are compounded by techniques known in this art. Capsules are readily prepared by mixing the active ingredient with a diluent such as starch or lactose and filling into the capsule.

In order to treat infected animals by means of a drench, the benzimidazoles are mixed with a suspending agent such as bentonite and the solid product added to water just prior to administration. The preferred drenches in accordance with this invention contain from about 5–50% by weight of benzimidazole compound.

The benzimidazoles described herein may also be administered as a component of the feed of the animals or dissolved or suspended in the drinking water. According to the invention, novel feed and feed supplement compositions are provided in which compounds of Formula I above are present as an active anthelmintic ingredient. Such compositions comprise the benzimidazoles intimately dispersed in or admixed with an inert carrier or diluent, i.e. one that is nonreactive with respect to the benzimidazole and that may be administered with safety to the animals. The carrier or diluent is preferably one that is or may be an ingredient of the animal ration.

In the feed supplement compositions the active ingredient is present in relatively large amounts. These supplements are suitable for addition to the feed either directly or after an intermediate dilution or blending step. Examples of carriers or diluents suitable for such compositions are solid orally ingestible carriers such as distillers' dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The anthelmintic agents are intimately dispersed or admixed throughout the solid inert carrier by methods such as grinding, stirring, milling, or tumbling. By selecting proper diluents and by altering the ratio of carrier to active ingredient, compositions of any desired concentration may be prepared.. Formulations containing from about 50% to about 50% by weight, and preferably from about 10–30% by weight, of active ingredient are particularly suitable for addition to feeds. The active compound is normally dispersed or mixed uniformly in the diluent but in some instances may be sorbed on the carrier.

Feed supplements are prepared by uniformly mixing the appropriate benzimidazoles with the carrier or carriers. Such supplements are added to the finished animal feed in an amount adequate to give the final concentration desired for controlling or treating helminthiasis by way of the animal ration. Although the preferred level in feeds will depend on the particular compound being employed, the anthelmintic compounds of this invention are normally fed at levels of 0.10–2.0% in the feed. One advantageous method of administering the compounds of this invention to animals whose feeds are conveniently pelleted, such as sheep, is to incorporate them directly in the pellets. For instance, benzimidazoles are readily incorporated in nutritionally adequate alfalfa pellets (during the pelleting operation) at levels of 0.5 to 5 grams per pound of pellets for therapeutic use, and at lower levels for prophylactic use, and such pellets fed to the worminfested animals. Alternatively, the benzimidazoles may be incorporated in salt licks or salt blocks at any desired concentration (concentrations of 5–25% by weight are conveniently employed). Large animals such as sheep, cattle and goats, then receive the anthelmintics with their salt.

The benzimidazole derivatives of the invention are also useful as anti-inflammatory agents. They may be used to decrease joint swelling, tenderness, pain and stiffness in mammalian species, e.g., in conditions such as rheumatoid arthritis. Compounds of Formula I may be compounded for such use according to accepted pharmaceutical practice in oral dosage forms such as tablets, capsules, elixirs or powders for administration of about 100 mg. to 2 gm. per day, preferably 100 mg. to 1 gm. per day in two to four divided doses.

The following examples further illustrate and represent preferred embodiments of the invention:

EXAMPLE 1

1-(2-thiazolin-2-yl)benzimidazole

To a solution of 6 g. of benzimidazole in 125 ml. of dry glyme there is added 1.5 g. of sodium hydride, and the mixture is stirred overnight. Then there is added at once 6.0 g. of 2-chloroethylisothiocyanate and stirring is continued at 40° for one hour. The solvent is removed under vacuum and water is added to the residue. The resulting solid is filtered off and crystallized from cyclohexane to yield 6.7 g., M.P. 81–83°.

Calcd. for $C_{16}H_9N_3S$ (percent): C, 59.10; H, 4.47; N, 20.67. Found (percent): C, 59.19; H, 4.52; N, 20.86.

EXAMPLE 2

1-(2-thiazolin-2-yl)-2-methyl-5(and 6)-nitrobenzimidazole

To a solution of 3.2 g. of 2-methyl-5-nitrobenzimidazole in about 100 ml. of dry glyme there is added 0.92 g. of sodium hydride (50% mineral oil dispersion). After one hour of stirring at room temperature there is added 2.4 g. of 2-chloroethylisothiocyanate in 5 ml. of glyme and refluxed for 1.5 hours. The solvent is evaporated and water is added to the residue. The formed solid is filtered off and crystallized from cyclohexane to yield 3.5 g. of isomeric mixture, M.P. 150–180°.

Calcd. for $C_{11}H_{10}N_4O_2S$ (percent): C, 50.37; H, 3.86; N, 21.36. Found (percent): C, 50.56; H, 3.87; N, 21.48.

EXAMPLE 3

1-(5,6-dihydro-4H-1,3-thiazin-2-yl)benzimidazole

To a solution of 4.3 g. of benzimidazole in 100 ml. of dry glyme there is added 1.7 g. of sodium hydride (50% mineral oil dispersion) and after one hour of stirring 1.7 g. of 3-bromopropylisothiocyanate is added. The mixture is refluxed for two hours. The solvent is evaporated and water is added to the residue. The resulting solid is filtered off and crystallized from cyclohexane to yield 3.0 g., M.P. 91–93°.

Calcd. for $C_{11}H_{11}N_3S$ (percent): C, 60.81; H, 5.11; N, 19.34. Found (percent): C, 60.61; H, 5.17; N, 19.36.

EXAMPLE 4

1-(2-thiazolin-2-yl)2-(4-thiazolyl)benzimidazole

To a refluxing solution of 3 g. of 2-(4-thiazolyl)benzimidazole in 400 ml. of dry glyme there is added cautiously 0.7 g. of sodium hydride (50% mineral oil dispersion) and the mixture is refluxed for two hours. After this period there is added 1.8 g. of 2-chloroethylisothiocyanate dissolved in 5 ml. of glyme. After 1.75 hours of refluxing the mixture is filtered and the filtrate is evaporated under vacuum. The residue is washed with petroleum ether (30–60°) and the undissolved residue crystallized from chloroform/ethyl ether, to yield 1.5 g., M.P. 109–111°.

Calcd. for $C_{13}H_{10}N_4S$ (percent): C, 54.52; H, 3.52; N, 19.56. Found (percent): C, 54.27; H, 3.45; N, 19.74.

EXAMPLE 5

1-(2-thiazolin-2-yl)-5,6-dichlorobenzimidazole

To a solution of 3 g. of 5,6-dichlorobenzimidazole in 125 ml. of glyme there is added 0.94 g. of sodium hydride (50% mineral oil dispersion) and the mixture is stirred for 1.5 hours. A solution of 2.4 g. of 2-chloroethylisothiocyanate in 5 ml. of dry glyme is added and the reaction mixture is refluxed for 1.5 hours. The solvent is evaporated and water is added to the residue. Upon standing the residue turns solid and is filtered off. Chromatography on neutral alumina (activity IV) yields on elution with ethyl ether 1.8 g., M.P. 150–154°.

Calcd. for $C_{10}H_7N_3Cl_2S$ (percent): C, 44.13; H, 2.59; N, 15.50. Found (percent): C, 44.41; H, 2.80; N, 15.32.

EXAMPLE 6

5(and 6)-methyl-1-(2-thiazolin-2-yl)-benzimidazole

A solution of 24.4 g. (0.20 mole) of m-toluidene diamine and 13.8 g. (0.30 mole) of formic acid in 200 ml. of 4 N HCl is refluxed for 2 hours. The cooled reaction mixture is then basified with conc. $NH_4OH$, and the brown oil that separates is removed and washed with $H_2O$. This crude oil is then crystallized from $H_2O$ to yield 14.9 g. (50%) M.P. 105–109° of 5-methylbenzimidazole.

To a solution of 4.0 g. (0.03 mole) of 5-methylbenzimidazole in 200 ml. of dry glyme is added, 1.1 g. of NaH, and the suspension is stirred for 1 hour at room temperature, at which time the evolution of $H_2$ has ceased. To this mixture is added 3.7 g. (0.03 mole) of $ClCH_2CH_2NCS$, and the resulting mixture is refluxed for 2 hours. The solvent is then removed by distillation in vacuo leaving a dark brown oil. This oil is recrystallized from $H_2O$ to yield 2.0 g. (31%) of the titled compound, M.P. 75–102°.

Calcd. (percent): C, 60.83; H, 5.35; N, 19.34. Found (percent): C, 61.01; H, 5.21; N, 19.07.

EXAMPLE 7

5(and 6)-nitro-1-(2-thiazolin-2-yl)benzimidazole

Following the procedure of Example 1 but substituting 3.3 g. (0.02 mole) 5-nitrobenzimidazole for the benzimidazole, 4.6 g. (93% yield) of the title compound is obtained, M.P. 160–190°. Two recrystallizations from benzene yields an analytical sample, M.P. 227–230°.

Calcd. (percent): C, 48.37; H, 3.25; N, 22.56. Found (percent): C, 48.66; H, 3.46; N, 22.79.

EXAMPLE 8

5,6-dimethyl-1-(2-thiazolin-2-yl)benzimidazole

Following the procedure of Example 1, but substituting 4.4 g. (0.03 mole) 5,6-dimethylbenzimidazole for benzimidazole, 6.4 g. (93%) of the title compound M.P. 125–129° C. is obtained. Recrystallization from hexane yields an analytical sample, M.P. 132–133° C.

Calcd. (percent): C, 62.32; H, 5.66; N, 18.16. Found (percent): C, 62.18; H, 5.80; N, 18.31.

EXAMPLE 9

5(and 6)-chloro-1-(2-thiazolin-2-yl)benzimidazole

Following the procedure of Example 1, but substituting 3.1 g. (0.02 mole) 5-chlorobenzimidazole for benzimidazole, 4.2 g. (88% yield) of title compound is obtained, M.P. 100–115°.

Calcd. (percent): C, 50.55; H, 3.39; N, 17.68. Found (percent): C, 50.27; H, 3.55; N, 17.97.

EXAMPLE 10

5(and 6)-chloro-1-(5,6-dihydro-4H-1,3-thiazin-2-yl)-benzimidazole

Following the procedure of Example 3, but substituting 3.1 g. (0.02 mole) of 5-chlorobenzimidazole for the benzimidazole and employing 3.6 g. (0.02 mole) of 3-bromopropylisothiocyanate, there is obtained 4.5 g. of a brown oil which is purified by passing it through an alumina column (activity IV) employing ethyl ether solvent to yield 2.2 g. (44%) of a colorless oil which solidifies upon standing. The solid is washed with petroleum ether to yield an analytical sample of the above title, M.P. 52–63°.

Calcd. (percent): C, 52.51; H, 4.00; N, 16.69. Found (percent): C, 52.24; H, 3.96; N, 16.43.

EXAMPLE 11

1-(5,6-dihydro-4H-1,3-thiazinyl)-2-(4-thiazolyl)benzimidazole, hydrochloride

To a refluxing solution of 4 g. of 2-(4-thiazolyl)-benzimidazole in 400 ml. of dry glyme there is added cautiously 0.5 g. of sodium hydride and the mixture is refluxed for five hours. After this period, a solution of 3.6 g. of 3-bromopropylisothiocyanate in 5 ml. of glyme is added and the refluxing is continued for 19 hours. The solvent is evaporated and the remaining oil is converted into the hydrochloride by first dissolving it in methanol and then adding an ethereal solution of hydrochloric acid. The formed solid is filtered off and recrystallized from ethanol-ethyl ether to yield 3.0 g. of the title compound, M.P. 174–176°.

Calcd. for $C_{14}H_{13}N_4S_2$ (percent): C, 49.92; H, 3.89; N, 16.64. Found (percent): C, 50.09; H, 3.83; N, 16.89.

EXAMPLES 12 to 62

Following the procedure of Examples 1 to 11 but substituting the benzimidazole derivative shown in column 1 of Table I below and the aliphatic haloalkylisothiocyanate shown in column 2, the product shown in column 3 is obtained.

Where the benzimidazole starting material is monosubstituted and includes a substituent at the 5 or 6 position, then the product shown in column 3 will include the 6-tautomer or 5-tautomer respectively; where the benzimidazole starting material is monosubstituted and includes a substituent at the 4 or 7 position, then the product shown in column 3 will include the 7-tautomer or 4-tautomer, respectively.

TABLE I

| Ex. No. | Column 1 | | | Column 2 | Column 3 | | |
|---|---|---|---|---|---|---|---|
| | R (position) | n | R¹ | Haloalkylisothiocyanate | (R)ₙ (position) | R¹ | R² |
| 12 | H | | $C_6H_5$ | SCN—CH₂—CH₂—Br | As in Column 1 | | (thiazoline ring) |
| 13 | H | | H₃C-phenyl- | SCN—CH₂—CH₂—Br | As in Column 1 | | Same as above. |
| 14 | H | | Cl-phenyl- | SCN—CH₂—CH₂—Br | As in Column 1 | | Do. |
| 15 | CH₃ (5) | 1 | CH₃-phenyl- | SCN—CH₂—CH₂—Br | As in Column 1 | | Do. |
| 16 | NO₂ (5) | 1 | Cl,Cl-phenyl- | SCN—CH₂—CH₂—Br | As in Column 1 | | Do. |
| 17 | Cl (5,6) | 2 | 2-naphthyl | SCN—CH₂—CH₂—Br | As in Column 1 | | Do. |
| 18 | H | | 3-pyridyl | SCN—CH₂—CH₂—Br | As in Column 1 | | Do. |
| 19 | CH₃OCONH (5) | 1 | $C_6H_5$ | SCN—CH₂—CH₂—Br | As in Column 1 | | Do. |
| 20 | CH₃CONH (6) | 1 | -phenyl-OCH₃ | SCN—CH₂—CH₂—Br | As in Column 1 | | Do. |

TABLE I—Continued

| | Column 1 | | | Column 2 | Column 3 | | |
|---|---|---|---|---|---|---|---|
| Ex. No. | R(position) | n | R¹ | Haloalkylisothiocyanate | (R)ₙ(position) | R¹ | R² |
| 21 | C₆H₅CH₂OCONH (5) | 1 | CH₃—C₆H₄— | SCN—CH₂CH₂CH₂—Cl | As in Column 1 | | (tetrahydrothiazine) |
| 22 | C₆H₅CONH (5) | 1 | C₆H₅ | SCN—CH₂CH₂CH₂—Cl | As in Column 1 | | Same as above. |
| 23 | C₂H₅CONH (5) | 1 | —CH₂C₆H₅ | SCN—CH₂CH₂CH₂—Cl | As in Column 1 | | Do. |
| 24 | C₂H₅OCONH (5) | 1 | thiophene | SCN—CH₂CH₂CH₂—Cl | As in Column 1 | | Do. |
| 25 | H | --- | C₉H₁₉ | SCN—CH₂CH₂CH₂—Cl | As in Column 1 | | Do. |
| 26 | (C₂H₅)NH (6) | 1 | C₆H₅ | SCN—CH₂CH₂CH₂—Br | As in Column 1 | | Do. |
| 27 | H | --- | CH₃ | SCN—CH₂CH₂CH₂—Br | As in Column 1 | | Do. |
| 28 | CN (6) | 1 | CH₂Cl | SCN—CH₂CH₂CH₂—Br | As in Column 1 | | Do. |
| 29 | NO₂ (5) | 1 | —C₆H₄—NO₂ | SCN—CH₂CH₂CH₂—Br | As in Column 1 | | Do. |
| 30 | NO₂ (5) | 1 | —C₆H₄—Cl | SCN—CH₂CH₂CH₂—Br | As in Column 1 | | Do. |
| 31 | H | --- | —C₆H₄—NO₂ | SCN—CH₂CH₂CH₂—Br | As in Column 1 | | Do. |
| 32 | H | --- | H | SCN—CH₂CH₂CH₂—Br | As in Column 1 | | Do. |
| 33 | H | --- | CH₂—C₆H₄—NO₂ | SCN—CH₂CHCl—C₆H₅ | As in Column 1 | | (thiazoline with C₆H₅) |
| 34 | H | --- | —C₆H₄—CH₂COOH | SCN—CH₂—CH₂Br | As in Column 1 | | (thiazoline) |
| 35 | CH₃ (4) | 1 | CH₂N(CH₃)₂ | SCN—CHCH₂Cl—CH₃ | As in Column 1 | | (thiazoline—CH₃) |
| 36 | Cl (5) | 1 | CH₂CN | SCN—CH₂CH₂Cl | As in Column 1 | | (thiazoline) |
| 37 | H | --- | —C₆H₄—CN | SCN—CH₂CH₂Br | As in Column 1 | | Same as above. |
| 38 | NO₂ | 1 | CO₂CH₃ | SCN—CH₂CH₂Cl | As in Column 1 | | Do. |
| 39 | H | --- | C₄H₉ | SCN—CHCH₂—Br, C₂H₅ | As in Column 1 | | (thiazoline—C₂H₅) |
| 40 | Br (5) | 1 | Br | SCN—CH₂CH₂Cl | As in Column 1 | | (thiazoline) |

TABLE I—Continued

| | Column 1 | | | Column 2 | Column 3 | | |
|---|---|---|---|---|---|---|---|
| Ex. No. | R (position) | n | R¹ | Haloalkylisothiocyanate | (R)ₙ (position) | R¹ | R² |
| 41 | $C_2H_5O\overset{O}{\underset{\|}{C}}-CH_2$ (6) | 1 | H | SCNCH₂CH₂Cl | As in Column 1 | | (thiazoline) |
| 42 | H | | (furyl) | SCNCH₂CH₂CH₂Br | As in Column 1 | | (thiazine) |
| 43 | H | | −N◯N−CH₃ | SCNCH₂CH₂CH₂Cl | As in Column 1 | | Same as above. |
| 44 | H | | (thienyl) | SCNCH₂CH₂CHBr–C₆H₅ | As in Column 1 | | C₆H₅-(thiazine) |
| 45 | H | | (pyridyl) | SCNCH₂CH₂CHCl–C₆H₅ | As in Column 1 | | Same as above. |
| 46 | H | | (pyridyl)-CO₂CH₃ | SCNCH₂CH₂CH₂Br | As in Column 1 | | (thiazine) |
| 47 | C₂H₅O (5) | 1 | CH₃ | SCNCH₂CH₂CH₂Cl | As in Column 1 | | (thiazine) |
| 48 | C₆H₅CH₂− (6) | 1 | (pyridyl) | SCNCH₂CH₂CH₂Cl | As in Column 1 | | Same as above. |
| 49 | CH₃–◯– (5) | 1 | −C₂H₄COOH | SCNCH₂CH₂CH₂Cl | As in Column 1 | | Do. |
| 50 | $C_4H_9\overset{O}{\underset{\|}{C}}$ | 1 | −C₆H₁₁ | SCNCH₂CH₂CH₂Cl | As in Column 1 | | Do. |
| 51 | $C_6H_5\overset{O}{\underset{\|}{C}}$ (5) | 1 | H | SCNCH₂CH₂CH₂Br | As in Column 1 | | Do. |
| 52 | −SCH₃ (6) | 1 | H | SCNCH₂CH₂CH₂Br | As in Column 1 | | Do. |
| 53 | C₃H₇S− (5) | 1 | (thienyl) | SCNCH₂CH₂CH₂Br | As in Column 1 | | Do. |
| 54 | C₆H₅O (5) | 1 | H | SCNCH₂CH₂CH₂Br | As in Column 1 | | Do. |
| 55 | C₆H₅S (5) | 1 | H | SCNCH₂CH₂CH₂Br | As in Column 1 | | Do. |
| 56 | CF₃ (5); CF₃ (6) | 2 | ◯−I | SCNCH₂CH₂CH₂Br | As in Column 1 | | Do. |
| 57 | −SCN (5) | 1 | −CH₂COOH | SCNCH₂CH₂CH₂Br | As in Column 1 | | Do. |
| 58 | NH₂ (5) | 1 | ◯−C₂H₅ | SCNCH₂CH₂CH₂Cl | As in Column 1 | | Do. |

TABLE I—Continued

| | Column 1 | | | Column 2 | Column 3 | |
|---|---|---|---|---|---|---|
| Ex. No. | R (position) | $n$ | $R^1$ | Haloalkylisothiocyanate | $(R)_n$ (position) $R^1$ | $R^2$ |
| 59 | $(CH_3)_2-N-CH_2-$ (6) | 1 | H | SCNCH$_2$CH$_2$Cl | As in Column 1 | (thiazoline ring) |
| 60 | CH$_3$OC(=O) (5) | 1 | H | SCNCH$_2$CH$_2$Cl | As in Column 1 | Same as above. |
| 61 | C$_6$H$_5$OC(=O) (6) | 1 | Cl | SCNCH$_2$CH$_2$Cl | As in Column 1 | Do. |
| 62 | —COOH (5) | 1 | H | SCNCH$_2$CH$_2$Cl | As in Column 1 | Do. |
| 63 | CH$_3$ (5) | 1 | H | SCNCH$_2$CH$_2$Cl | As in Column 1 | Do. |
| 64 | C$_2$H$_5$NHC(=O) (6) | 1 | Br | SCNCH$_2$CH$_2$Br | As in Column 1 | Do. |
| 65 | C$_6$H$_5$NHC(=S) (5) | 1 | CH$_3$ | SCNCH$_2$CH$_2$Br | As in Column 1 | Do. |
| 66 | CN (5) | 1 | C$_6$H$_5$ | SCNCH$_2$CH$_2$Br | As in Column 1 | Do. |
| 67 | $(CH_3)_2N(CH_2)_2NH$ (6) | 1 | C$_2$H$_5$ | SCNCH$_2$CH$_2$Br | As in Column 1 | Do. |
| 68 | C$_6$H$_5$—C(=O)— (5) | 1 | CH$_2$Cl | SCNCH$_2$CHCl—C$_6$H$_4$—NO$_2$ | As in Column 1 | (4-nitrophenyl thiazoline) |
| 69 | C$_6$H$_5$—CNH(=O) (5) | 1 | C$_2$H$_5$COOH | SCNCH$_2$CH$_2$Br | As in Column 1 | (thiazoline ring) |
| 70 | C$_2$H$_5$OCNH(=O) (6) | 1 | C$_4$H$_9$ | SCNCH$_2$CHBr—C$_6$H$_5$ | As in Column 1 | (C$_6$H$_5$-substituted thiazoline) |
| 71 | CF$_3$ (5) | 1 | H | SCNCH$_2$CH$_2$CHCl—C$_6$H$_5$ | As in Column 1 | (C$_6$H$_5$-substituted thiazine) |
| 72 | CH$_3$C(=O) (5) | 1 | (cyclohexyl-H) | SCNCH$_2$CHCH$_2$Br, CH$_3$ | As in Column 1 | (CH$_3$-substituted thiazine) |
| 73 | CH$_3$CNH(=O) (6) | 1 | H | SCNCH$_2$CH$_2$CH$_2$Br | As in Column 1 | (thiazine ring) |

What is claimed is:

1. A compound of the structure

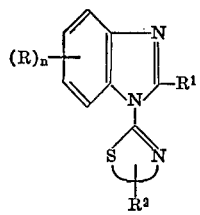

wherein R is selected from the group consisting of hydrogen; lower alkyl; lower alkoxy; aralkyl; aryl; aryloxy; an acyl group containing less than twelve carbon atoms selected from the group consisting of lower alkanoyl, lower alkenoyl, monocarbocyclic aroyl, monocarbocyclic aryl-lower alkanoyl, cycloalkanoyl, cycloalkenoyl, cycloalkyl-lower alkanoyl, and cycloalkenyl-lower alkanoyl; lower alkylthio; arylthio; trifluoromethyl; nitro; halo; cyano; thiocyanato; amino; mono- or di-lower alkylamino; mono- or diarylalkylamino; mono- or di-lower alkylarylamino; mono- or diarylamino;

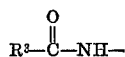

wherein $R^3$ is selected from the group consisting of hydrogen, lower alkyl, aryl, alkylaryl, and arylalkyl; dialkylaminoalkyl; carboxyl; lower alkoxycarbonyl; aryloxycarbonyl; —NHCOOR⁴ wherein $R^4$ is selected from the group consisting of alkyl, arylalkyl, and aryl; carbamoyl; and thiocarbamoyl; $R^1$ is selected from the group consisting of hydrogen; lower alkyl; arylalkyl; cycloalkyl; halo; aryl; alkylaryl; —(R⁶)$_{n^1}$COOH wherein $R^6$ is alkylene having from 1 to about 6 carbon atoms and $n^1$ is 0 or 1; and a heterocyclic group selected from the group consisting of thienyl, furyl, chlorofuryl, dichlorofuryl, pyrryl, pyridyl, coumarinyl, thiacoumarinyl, thiazolyl, isothiazolyl, imidazolyl, piperazinyl, alkylpiperazinyl, and pyrazinyl; $R^2$ is selected from the group consisting of hydrogen, lower alkyl, arylalkyl, aryl, and alkylaryl;

represents a 5 or 6 membered ring; $n$ is 1 or 2; wherein the term aryl, unless otherwise limited, refers to a mono- or bicarbocyclic aromatic ring system of 6 to 10 carbon atoms; wherein the term alkyl, both when used alone and when used as part of a larger group, refers to an aliphatic hydrocarbon group having up to 7 carbon atoms; wherein the term cycloalkyl refers to a saturated carbocyclic ring system having from 3 to about 8 carbon atoms; and physiologically acceptable acid-addition salts thereof.

2. A compound in accordance with claim 1 having the structure

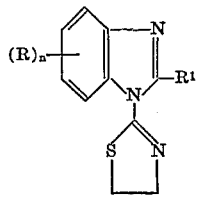

3. A compound in accordance with claim 1 having the structure

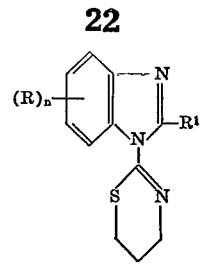

4. A compound in accordance with claim 1 having the structure

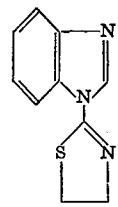

5. A compound in accordance with claim 1 having the structure

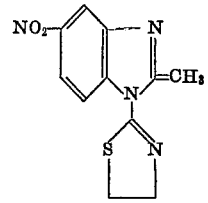

6. A compound in accordance with claim 1 having the structure

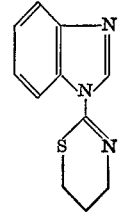

7. A compound in accordance with claim 1 having the structure

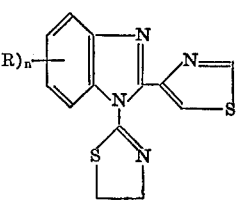

8. A compound in accordance with claim 1 having the structure

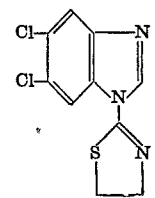

9. A compound in accordance with claim 1 having the structure

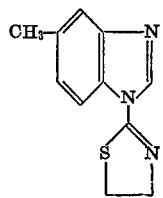

10. A compound of the structure selected from the group consisting of:

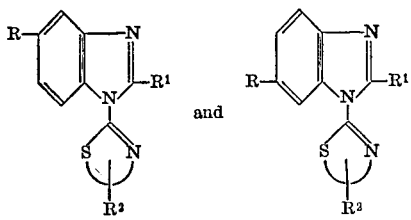

and wherein R is selected from the group consisting of hydrogen; lower alkyl; lower alkoxy; aralkyl; aryl; aryloxy; an acyl group containing less than twelve carbon atoms selected from the group consisting of lower alkanoyl, lower alkenoyl, monocarbocyclic aroyl, monocarbocyclic aryl-lower alkanoyl, cycloalkanoyl, cycloalkenoyl, cycloalkyl-lower alkanoyl, and cycloalkenyl-lower alkanoyl; lower alkylthio; arylthio; trifluoromethyl; nitro; halo; cyano; thiocyanato; amino; mono- or di-lower alkylamino; mono- or diarylalkylamino; mono- or di-lower alkylarylamino; mono- or diarylamino;

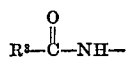

wherein $R^3$ is selected from the group consisting of hydrogen, lower alkyl, aryl, alkylaryl, and arylalkyl; dialkylaminoalkyl; carboxyl; lower alkoxycarbonyl; aryloxycarbonyl; —NHCOOR$^4$ wherein R$^4$ is selected from the group consisting of alkyl, arylalkyl, and aryl; carbamoyl; and thiocarbamoyl; R1 is selected from the group consisting of hydrogen; lower alkyl; arylalkyl; cycloalkyl; halo; aryl, alkylaryl; —(R$^6$)$_{n1}$COOH wherein R$^6$ is alkylene having from 1 to about 6 carbon atoms and $n^1$ is 0 or 1; and a heterocyclic group selected from the group consisting of thienyl, furyl, chlorofuryl, dichlorofuryl, pyrryl, pyridyl, coumarinyl, thiacoumarinyl, thiazolyl, isothiazolyl, imidazolyl, piperazinyl, alkylpiperazinyl, and pyrazinyl; R$^2$ is selected from the group consisting of hydrogen, lower alkyl, arylalkyl, aryl, and alkylaryl;

represents a 5 or 6 membered ring; $n$ is 1 or 2; wherein the term aryl, unless otherwise limited, refers to a mono- or bicarbocyclic aromatic ring system of 6 to 10 carbon atoms; wherein the term alkyl, both when used alone and when used as part of a larger group, refers to an aliphatic hydrocarbon group having up to seven carbon atoms; wherein the term cycloalkyl refers to a saturated carbocyclic ring system having from 3 to about 8 carbon atoms; and physiologically acceptable acid-addition salts thereof.

References Cited
UNITED STATES PATENTS 2,577,409  12/1951  Emerson et al. _____ 260—243
3,499,083   3/1970  Levitt _____ 260—243

JOHN M. FORD, Primary Examiner

U.S. Cl. X.R.

260—306.7; 424—246, 270